United States Patent [19]
Postma

[11] Patent Number: 6,028,749
[45] Date of Patent: *Feb. 22, 2000

[54] MAGNETIC HEAD HAVING A MULTILAYER STRUCTURE AND METHOD OF MANUFACTURING THE MAGNETIC HEAD

[75] Inventor: Lambertus Postma, Eindhoven, Netherlands

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/101,324

[22] Filed: Aug. 2, 1993

[30] Foreign Application Priority Data

Aug. 6, 1992 [EP] European Pat. Off. ............. 92202435

[51] Int. Cl.$^7$ ........................................................ G11B 5/33
[52] U.S. Cl. ................................................................ 360/113
[58] Field of Search .............................................. 360/113

[56] References Cited

U.S. PATENT DOCUMENTS

| | | | |
|---|---|---|---|
| 4,052,748 | 10/1977 | Kuijk | 360/113 |
| 4,122,505 | 10/1978 | Kuijk | 360/113 |
| 4,639,806 | 1/1987 | Kira et al. | 360/113 |
| 4,903,158 | 2/1990 | Smith | 360/113 |
| 5,005,096 | 4/1991 | Krounbi et al. | 360/113 |
| 5,097,371 | 3/1992 | Somers | 360/113 |
| 5,181,149 | 1/1993 | Katsumata et al. | 360/113 |

FOREIGN PATENT DOCUMENTS

| | | |
|---|---|---|
| 0375646 | 6/1990 | European Pat. Off. . |
| 0551603 | 7/1993 | European Pat. Off. . |

*Primary Examiner*—David D. Davis
*Attorney, Agent, or Firm*—John C. Fox

[57] ABSTRACT

Magnetic head having a multilayer structure which comprises at least one magnetoresistive layer (9) and a transducing gap terminating in a head face. The magnetoresistive layer has an active central portion located between two end portions, which central portion is provided with equipotential strips (13). Layers (15) of a hard-magnetic material with an axis of magnetization extending in the longitudinal direction of the magnetoresistive layer are provided opoosite to, and spaced apart from the end portions, a non-magnetic spacer layer (17) of electrically insulating material being present between the end portions and said layers of hard-magnetic material.

15 Claims, 1 Drawing Sheet

MAGNETIC HEAD HAVING A MULTILAYER STRUCTURE AND METHOD OF MANUFACTURING THE MAGNETIC HEAD

BACKGROUND OF THE INVENTION

The invention relates to a magnetic head for detecting a magnetic field representing information on a magnetic recording medium, said magnetic head having a head face and comprising a multilayer structure with at least one magnetoresistive layer of magnetic anisotropic material, said magnetoresistive layer having a central portion forming a magnetoresistive element and located between two end portions with a longitudinal axis directed from one end portion to the other end portion, said magnetoresistive element having an easy axis of magnetization extending at least substantially parallel to the longitudinal axis and being provided on one side with a layer comprising at least one equipotential strip which extends at an angle to the longitudinal axis.

A magnetic head of this type is known from U.S. Pat. No. 4,052,748 (herewith incorporated by reference).

The known magnetic head comprises an elongate magnetoresistive element of magnetic anisotropic material which has an easy axis of magnetization extending in the longitudinal direction of the element and a defined direction of magnetization extending at least substantially parallel to the easy axis of magnetization. Contacts for connecting the magnetoresistive element to a current or voltage source are provided at two end portions arranged opposite each other. The magnetoresistive element has satisfactorily conducting equipotential strips which are arranged at a minimum angle of 30° and a maximum angle of 60° with respect to the longitudinal axis of the magnetoresistive element. During operation the equipotential strips force an electric measuring current applied to the magnetoresistive element to flow through the element at an angle with respect to the easy axis of magnetization, while a longitudinal bias is generated. In practice, said angle of current flow is approximately 45°. Under the influence of a magnetic field generated by recorded information of a record carrier moving along the magnetic head, the resistance of each part of the magnetoresistive element located between the equipotential strips decreases or increases, dependent on whether the direction of magnetization coincides with the current direction in the magnetoresistive element to a greater or lesser degree. In principal, a linear reproduction by means of a non-biased magnetoresistive head is possible. To improve the linearity of the behaviour of the magnetoresistive element, an auxiliary field may be applied.

It is known per se from U.S. Pat. No. 5,005,096 (herewith incorporated by reference) to provide in a thin film magnetic head hard-magnetic layers opposite end portions of a magnetoresistive layer, which layers are magnetostatically coupled to the magnetoresistive layer. A magnetoresistive sensor without equipotential strip or strips is arranged between said end portions. Instead of equipotential strips, the head has a soft-magnetic layer extending underneath and parallel to the magnetoresistive layer and separated therefrom by a non-magnetic layer. The soft-magnetic layer generates a transversal bias field in the magnetoresistive sensor for linearizing the sensor. Non-magnetic spacer layers of electrically conducting material, viz Cr, W, Nb or Ta are present between the hard-magnetic layers extending above the magnetoresistive layer and said end portions. The hard-magnetic layers also serve as electric conductors between electrically conducting connection tracks provided on the hard-magnetic layers and the electrically conducting spacer layers. Consequently, the connection tracks are electrically connected to the magnetoresistive layer via the hard-magnetic layers and the spacer layers.

A thin-film magnetic head of yet another type is known from U.S. Pat. No. 4,639,806 (herewith incorporated by reference), in which hard-magnetic thin layers are directly provided on end portions of a ferromagnetic thin film (MR element). The MR element is coupled in exchange with the hard-magnetic thin layers. The hard-magnetic thin layers are provided with electric conductors which are electrically connected to the MR element via the hard-magnetic thin layers.

It has been found that due to external influences such as, for example the presence of an external magnet or exposure to high temperatures, the adjusted direction of magnetization of the magnetoresistive element may be disturbed so that the operation of the magnetic head deteriorates. It has also been found that at small measuring currents the longitudinal bias due to the presence of equipotential strips is too low to prevent Barkhausen noise (spurious signals caused by the movement of magnetic domain walls in the magnetoresistive element).

OBJECTS AND SUMMARY OF THE INVENTION

It is an object of the invention to provide a magnetic head of the type described in the opening paragraph which comprises a stable magnetoresistive element which is insensitive to external influences and does not produce any Barkhausen noise, also at a small measuring current.

To this end the magnetic head according to the invention is characterized in that opposite each end portion, on a side of the magnetoresistive element remote from the layer comprising at least one equipotential strip, the multilayer structure comprises a layer of hard-magnetic material having an axis of magnetization extending parallel to the longitudinal axis of the magnetoresistive element, and a non-magnetic spacer layer of electrically insulating material between each end portion and the facing layer of hard-magnetic material.

The layers of hard-magnetic material present exclusively opposite to, and spaced apart from the end portions are magnetostatically coupled to the magnetoresistive element. The longitudinal field consequently present in the magnetoresistive element inhibits the movement of domain walls which may be present, particularly proximate to the end portions of the magnetoresistive layer, and maintains the adjusted direction of magnetization of the magnetoresistive element.

The magnetic head according to the invention does not impose any particular technological requirements. This means that the magnetic head can be manufactured using a limited number of relatively simple process steps.

It has been found by experiment that an alloy of cobalt-platinum is eminently suitable for use as the hard-magnetic material. The coercive force $H_c$ of the hard-megnetic material should have a minimum value of 500 Oe in view of the magnitude of the magnetic field strength of the usually occurring interference fields, and is preferably between present 500 and present 1000 Oe. An oxide, preferably $Al_2O_3$ or $SiO_2$, may be used as a material for the non-magnetic, electrically insulating spacer layer.

An embodiment of the magnetic head according to the invention is characterized in that hard-magnetic material is enclosed between two non-magnetic layers, one of which is the spacer layer. The other layer is of particular importance if the multilayer structure is provided on a magnetic substrate. The non-magnetic layer may be an oxide, preferably $SiO_2$ or $Al_2O_3$.

An embodiment in which the multilayer structure is present on a magnetic or non-magnetic substrate is characterized in that, viewed from the substrate, the multilayer structure successively comprises a non-magnetic layer, a layer of hard-magnetic material, a spacer layer, the magnetoresistive layer and the layer comprising at least one equipotential strip. This practical embodiment has outstanding properties and can be manufactured in a relatively simple manner. The non-magnetic layer may be an oxide, preferably $SiO_2$ or $Al_2O_3$.

An embodiment which is attractive from a technological point of view is characterized in that the layer comprising at least one equipotential strip is provided with electrically conducting connection tracks each extending from an end portion. Together with the end portions of the magnetoresistive layer, the connection tracks establish electric contact and are provided with contacts for connection to a current or voltage source. The connection tracks and equipotential strip or strips can be provided in one and the same processing step during manufacture, and are preferably formed of a layer of Au which preferably extends between two thin layers of Mo.

The invention also relates to a method of manufacturing a magnetic head according to the invention.

The method according to the invention is characterized in that a non-magnetic layer, at least one layer of a hard-magnetic material, a non-magnetic, electrically insulating spacer layer, a magnetoresistive layer and a layer forming at least one equipotential strip are successively structured. With this method a reliable magnetic head provided with a stable magnetoresistive element can be manufactured in a limited number of process steps.

BRIEF DESCRIPTION OF THE DRAWING

These and other aspects of the invention will be apparent from and elucidated with reference to the embodiments described hereinafter, in connection the with drawings, inwhich.

Figure 1:
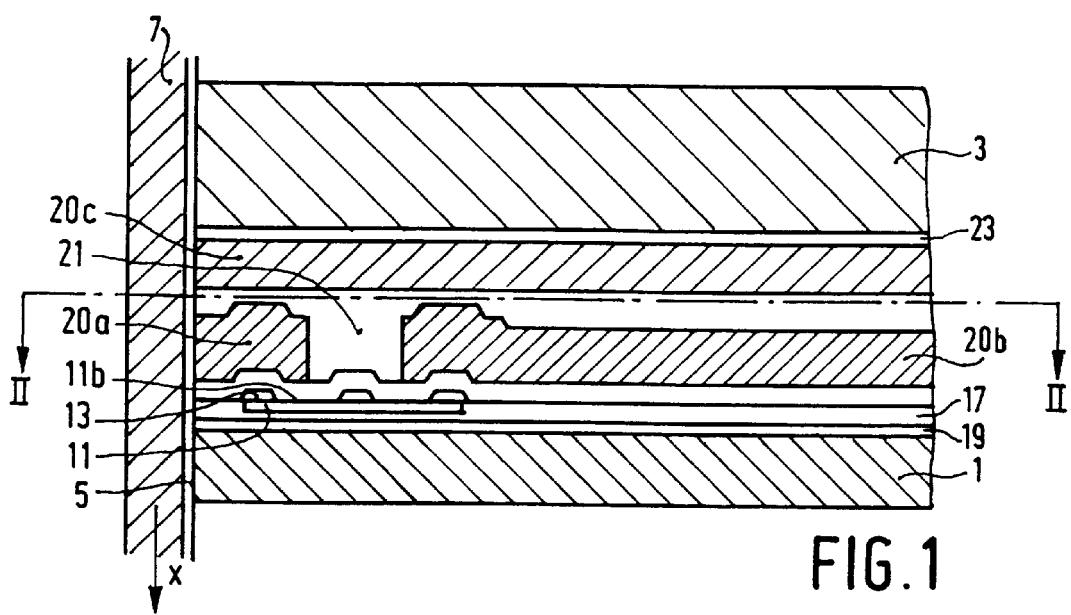
FIG. 1 is a diagrammatic cross-section of an embodiment of the magnetic head according to the invention.
Figure 2:
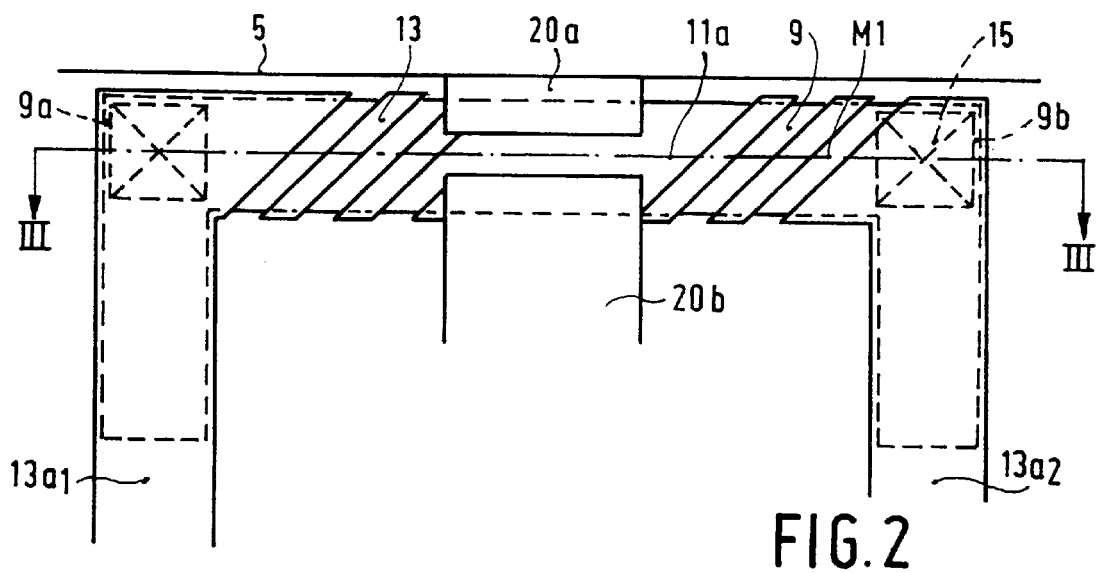
FIG. 2 is a diagrammatic cross-section taken on the line II—II of FIG. 1.

Referring to the Figures, one embodiment of the thin-film magnetic head according to the invention comprises a substrate 1 of a non-magnetic material, for example $Al_2O_3$. TiC, on which a multilayer structure and a counterblock 3 of a non-magnetic material, for example $Al_2O_3$. TiC, are provided. The magnetic head has a head face 5 for guiding a magnetic recording medium 7, particularly a magnetic tape, in a direction x.

The multilayer structure which extends between the substrate 1 and the counterblock 3 comprises a magnetoresistive layer 9 of a magnetic anisotropic material, for example Ni—Fe which forms an elongate magnetoresistive element 11 between two end portions 9a and 9b with a longitudinal axis 11a extending from one end portion to the other. The magnetoresistive element 11, briefly referred to as the MR element, has an easy axis of magnetization denoted by $M_1$ extending parallel to the longitudinal axis 11a. The direction of magnetization is indicated by the vector $\overline{M}$. A layer 13a of, for example Au comprising a plurality of equipotential strips 13 is provided at one side 11b of the element 11. The equipotential strips extend at an angle of 45° to the longitudinal axis 11a. The electrically conducting layer 13a has two connection tracks 13a1 and 13a2, to which a current or voltage source is connectable. A small measuring current of 5 to 10 mA is used during operation.

Figure 3:
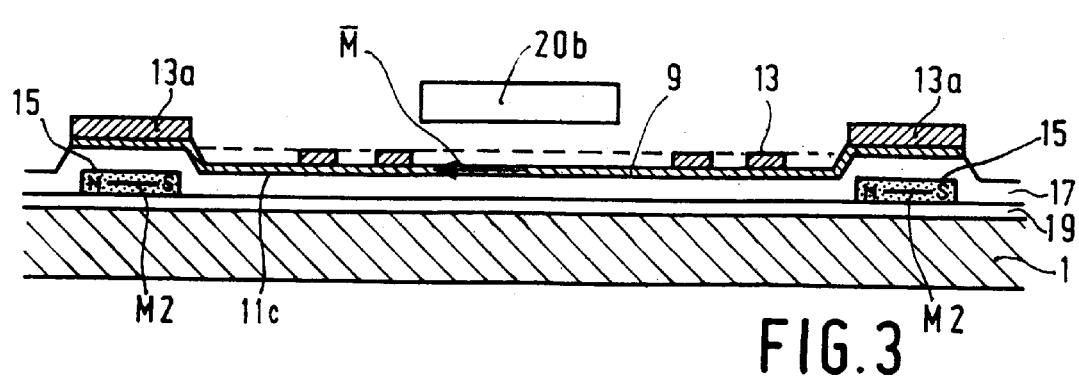
FIG. 3 is a diagrammatic cross-section taken on the line III—III of FIG. 2.

The multilayer structure also comprises a layer 15 of a hard-magnetic material, for example Co—Pt located opposite to, and spaced apart from the end portions 9a and 9b. The layers 15 located at a side 11c of the MR element remote from the layer comprising the equipotential strips have an axis of magnetization $M_2$ extending parallel to the longitudinal axis 11a and are permanently magnetized, as is shown in FIG. 3 by means of the letters N (northpole) and S (southpole). Consequently, the direction of magnetization of the layers 15 corresponds to the adjusted direction of magnetization $\overline{M}$ of the MR element 11. A non-magnetic spacer layer 17 of electrically insulating material, for example $SiO_2$, is present between the hard-magnetic layers 15 and the magnetoresistive layer 9. A non-magnetic layer 19 of, for example $Al_2O_3$ or $SiO_2$ is present between the substrate 1 and the hard-magnetic layers 15. The multilayer structure further comprises a pair of flux guides of a soft-magnetic material, for example NiFe or AlFeSi comprising first flux guide 20a adjacent to the head face 5 and, spaced apart therefrom, a second flux guide 20b. A space 21 present between the two flux guides is bridged by the MR element 11, the first flux guide 20a being used for directing a magnetic field comprising information from the magnetic medium 7 to an MR element 11. Insulating material, for example $SiO_2$ is provided in the space 21, between the MR element 11 and the flux guides 20a and 20b and between the flux guides 20a and 20b and a third flux guide 20c.

The magnetic head according to the invention can be realised in a limited number of process steps. The method according to the invention starts from the substrate 1 on which the non-magnetic layer 19, the two layers 15 of hard-magnetic material, the spacer layer 17, the magnetoresistive layer 9 and the layer 13a forming the equipotential strips 13 are successively provided. After an insulation layer has been provided, the flux guides 20a, 20b and 20c can be provided with an adhesive layer 23 and finally the counterblock 3 is provided. The layers forming part of the multilayer structure may be formed by known thin-film techniques, for example, vapour deposition or sputtering. Lithographic methods may also be used. After the counterblock 3 has been provided, the head face 5 can be formed, for example by grinding and polishing.

It is to be noted that the invention is not limited to the embodiment shown. For example, the magnetic head according to the invention may be provided, for example with a plurality of MR elements arranged adjacent to each other with respect to the substrate for simultaneously scanning several magnetic tracks present on a magnetic recording medium. Instead of said alloy of cobalt-platinum, other hard-magnetic materials may alternatively be used. The measures according to the invention may of course also be used in a magnetic head comprising a magnetic substrate of, for example NiZn ferrite.

I claim:

1. A magnetic head for detecting a magnetic field representing information recorded on a magnetic recording medium, said magnetic head having a head face and comprising a multilayer structure with at least one magnetoresistive layer of magnetic anisotropic material, said magnetoresistive layer having a central portion forming a magnetoresistive element located between two end portions, said magnetoresistive layer having a longitudinal axis directed from one end portion to the other end portion, said magnetoresistive element having an easy axis of magnetization extending at least substantially parallel to the longitudinal axis and having an adjusted direction of magnetization and, an electrically conducting layer provided on one side of said magnetoresistive layer, said conducting layer comprising at least one equipotential strip which extends at an angle to the longitudinal axis, characterized in that a local layer of hard magnetic material is located opposite each end portion, on a side of the magnetoresistive element remote from the conducting layer, which local layers each have an axis of magnetization extending parallel to the longitudinal axis of the magnetoresistive layer, the direction of magnetization of the local layers corresponding to the adjusted direction of magnetization of the magnetoresistive element, and in that a non-magnetic spacer layer of electrically insulating material is present between each end portion and the facing local layer of hard-magnetic material.

2. A magnetic head as claimed in claim 1, characterized in that the hard-magnetic material comprises an alloy of cobalt-platinum.

3. A magnetic head as claimed in claim 2, characterized in that the spacer layer comprises $Al_2O_3$ or $SiO_2$.

4. A magnetic head as claimed in claim 2, characterized in that the hard-magnetic material is enclosed between two non-magnetic layers, one of which is the spacer layer.

5. A magnetic head as claimed in claim 2, in which the multilayer structure is present on a substrate, characterized in that, viewed from the substrate, the multilayer structure successively comprises a non-magnetic layer, the layer of hard-magnetic material, the spacer layer, the magnetoresistive layer and the conductive layer.

6. A magnetic head as claimed in claim 2, characterized in that the conductive layer is provided with two electrically conducting connection tracks, each extending from an end portion of the layer.

7. A magnetic head as claimed in claim 1, characterized in that the spacer layer comprises substantially $Al_2O_3$ or $SiO_2$.

8. A magnetic head as claimed in claim 7, characterized in that the hard-magnetic material is enclosed between two non-magnetic layers, one of which is the spacer layer.

9. A magnetic head as claimed in claim 7, in which the multilayer structure is present on a substrate, characterized in that, viewed from the substrate, the multilayer structure successively comprises a non-magnetic layer, the layer of hard-magnetic material, the spacer layer, the magnetoresistive layer and the conductive layer.

10. A magnetic head as claimed in claim 7, characterized in that the conductive layer is provided with two electrically conducting connection tracks, each extending from an end portion of the layer.

11. A magnetic head as claimed in claim 1, characterized in that the hard-magnetic material is enclosed between two non-magnetic layers, one of which is the spacer layer.

12. A magnetic head as claimed in claim 11, characterized in that the conductive layer is provided with two electrically conducting connection tracks, each extending from an end portion of the layer.

13. A magnetic head as claimed in claim 1, in which the multilayer structure is present on a substrate, characterized in that, viewed from the substrate, the multilayer structure successively comprises a non-magnetic layer, the layer of hard-magnetic material, the spacer layer, the magnetoresistive layer and the conductive layer.

14. A magnetic head as claimed in claim 13, characterized in that the conductive layer is provided with two electrically conducting connection tracks, each extending from an end portion of the layer.

15. A magnetic head as claimed in claim 1, characterized in that the conductive layer is provided with two electrically conducting connection tracks, each extending from an end portion of the layer.

* * * * *